United States Patent [19]

McPhee et al.

[11] Patent Number: 5,591,067
[45] Date of Patent: Jan. 7, 1997

[54] SEALED WASTE TRANSFER SYSTEM FOR VACUUM BLASTING

[75] Inventors: William S. McPhee, Arlington; Stephen B. Mudd, Jr., Reston, both of Va.

[73] Assignee: LTC Americas Inc., Sterling, Va.

[21] Appl. No.: 611,816

[22] Filed: Mar. 6, 1996

Related U.S. Application Data

[62] Division of Ser. No. 339,199, Nov. 10, 1994, Pat. No. 5,529,530.

[51] Int. Cl.[6] .................................................. B24C 9/00
[52] U.S. Cl. .................................... 451/88; 451/75; 232/44
[58] Field of Search ............................. 451/38, 39, 40, 451/75, 87, 88, 89, 92, 101, 456; 232/1 R, 44; 220/2, 86.1, 908

[56] References Cited

U.S. PATENT DOCUMENTS

| 3,563,452 | 2/1971 | Cantella | 232/44 |
|---|---|---|---|
| 4,013,215 | 3/1977 | Mercier | 232/44 |
| 4,232,487 | 11/1980 | Brown | 451/88 |
| 4,827,678 | 5/1989 | MacMillan et al. | 451/88 |
| 5,035,089 | 7/1991 | Tillman et al. | 451/88 |
| 5,100,412 | 3/1992 | Rosso | 451/87 |
| 5,107,632 | 4/1992 | Stern et al. | 451/92 |
| 5,402,835 | 4/1995 | Middleton | 220/86.1 |

*Primary Examiner*—Bruce M. Kisliuk
*Assistant Examiner*—Eileen Morgan
*Attorney, Agent, or Firm*—Lane, Aitken & McCann

[57] ABSTRACT

A vacuum blasting machine with a sealed waste transfer system has a collapsible sleeve that provides a containment interface between the waste chamber and the waste collection drum. The periphery of one end of the sleeve is secured around the periphery of the opening in the waste collection drum. In the transfer operation, the other end of the sleeve is pulled over the dump housing, providing an impervious containment barrier between the dump housing and the interior of the collection drum. The drum has a vent opening with a bushing to which a vent line is attached. A vent line connects the collection drum to the interior of the waste chamber via a valve.

4 Claims, 6 Drawing Sheets

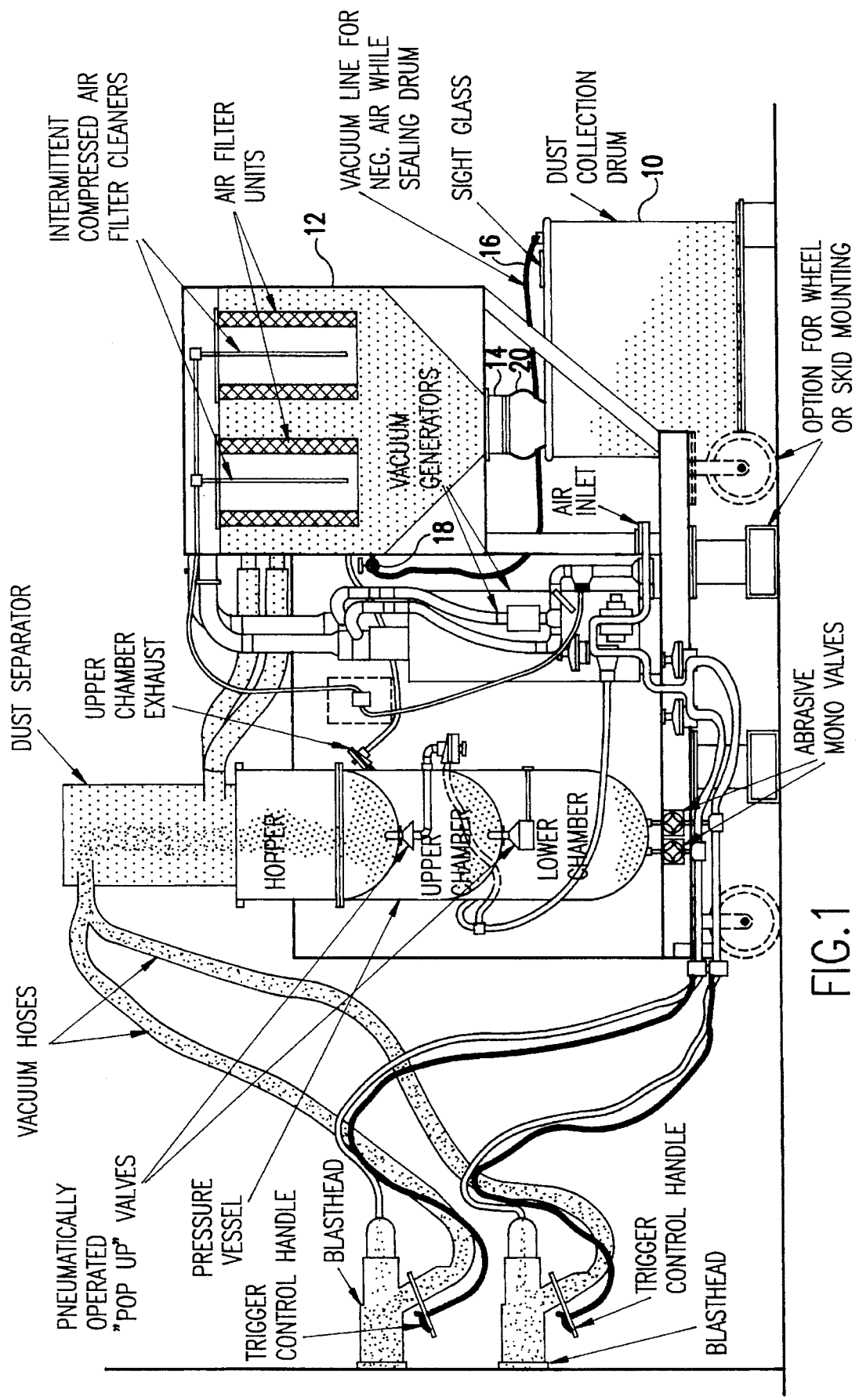

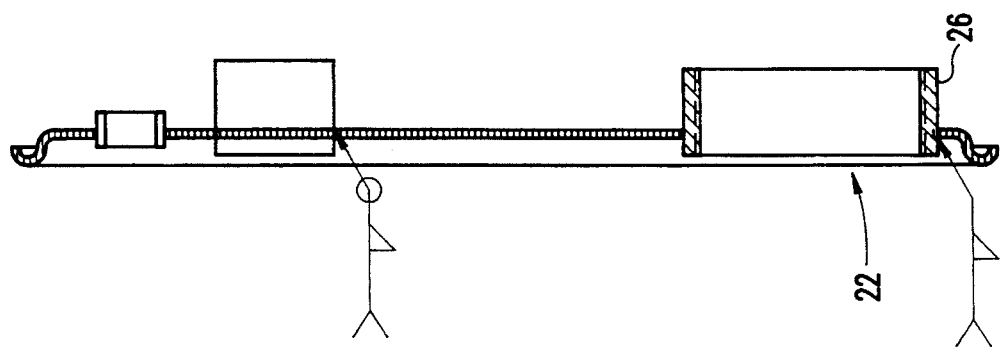
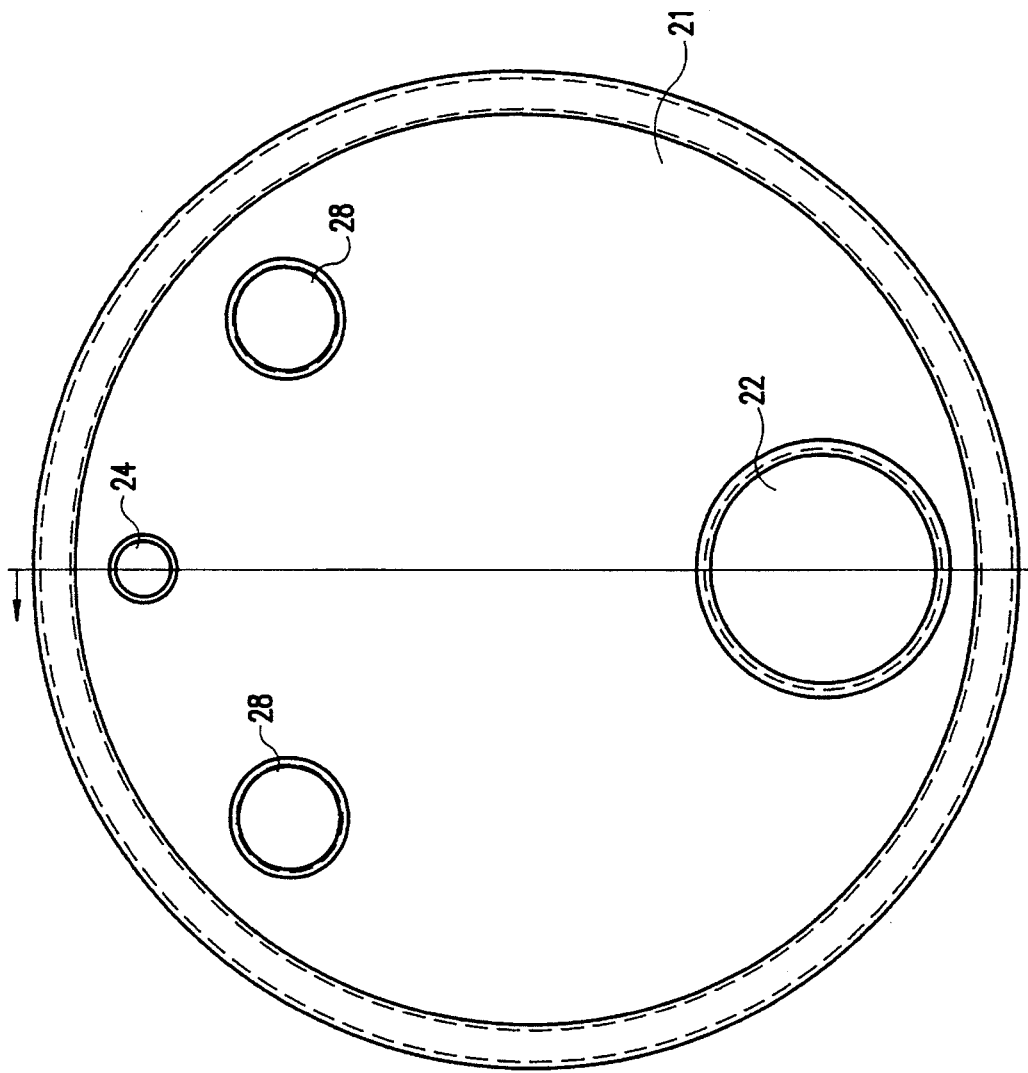

SEALED WASTE TRANSFER SYSTEM FOR VACUUM BLASTING

CROSS REFERENCE TO RELATED APPLICATION

This application is a division of application Ser. No. 08/339,199 of William S. McPhee et al., filed Nov. 10, 1994 U.S. Pat. No. 5,529,530.

BACKGROUND OF THE INVENTION

FIELD OF THE INVENTION

This invention relates to what is referred to in the art as vacuum blasting, and more particularly, to a sealed waste transfer system for vacuum blasting machines using recyclable abrasives.

As will be appreciated by those skilled in the art, vacuum blasting refers to an improved technology for cleaning and preparing surfaces by blasting the surface with an abrasive entrained in a relatively high velocity air stream. In vacuum blasting, a small hood surrounds the blasting nozzle and a vacuum port within the hood, adjacent the nozzle, sucks up the abrasive and debris particles loosened from the surface being blasted. This abrasive and debris mixture passes through a hose to a separator, where the debris (i.e., dust) particles are separated from the abrasive. The separated debris particles are deposited in a closed waste chamber, which is maintained below atmospheric pressure during the blasting operation. Abrasive separated from the debris is returned to a hopper and used again in the blasting operation. This invention supports vacuum blasting machines which recycle abrasives such as steel grit, aluminum oxide and walnut shells. Vacuum blasting machines of the type thus far described are commercially available from applicants' assignee and an example is shown schematically in FIG. 1.

It will be appreciated that vacuum blasting machines provide closed-system blasting by making the blast head in effect a small "containment structure." The coating and/or corrosion materials removed from the surface being treated, plus spent abrasive, are all deposited into a closed waste chamber. In operation, the system is virtually dust free and, therefore, relatively safe for the operator and the environment, even when blasting surfaces covered with potentially hazardous materials, such as lead and radioactive contaminants. While generally satisfactory in operation, applicants have identified a potential weak point where some debris in vacuum blasting systems can escape.

Periodically, the waste chamber of the vacuum blasting system is emptied into a removable container, such as a waste collection drum. To this end, the waste chamber is provided with a waste dump, which comprises a housing extending from the waste chamber and a bellows valve within the housing. Inflated, the bellows valve seals the waste chamber and deflated allows dust from the chamber to flow through the dump into the drum. In the prior art, an opening in a removable container (i.e., a drum) is placed beneath the dump housing. Typically, the waste chamber is externally or internally vibrated in order to facilitate the flow of dust into the removable collection drum via the dump housing. Dust may escape during this transfer operation because there is no prior art containment structure at the interface between the waste chamber dump and the waste collection drum. Moreover, even if a containment structure were erected around this interface, dust left on the walls of such a containment structure would be a potential hazard.

SUMMARY OF THE INVENTION

An object of this invention is the provision of a sealed waste transfer system for vacuum blasting machines to prevent emission and/or dispersal of the waste during the transfer of waste from the waste chamber to a removable waste collection drum.

Briefly, this invention contemplates the provision of a vacuum blasting machine with a sealed waste transfer system in which a collapsible sleeve provides a containment interface between the waste chamber and the waste collection drum. In one embodiment, the sleeve is secured around the periphery of the opening in the waste collection drum. In a preferred embodiment, there is a containment bag in the drum and the sleeve extends from an opening in the top of the containment bag. In the transfer operation, the sleeve is pulled over the dump housing, providing an impervious containment barrier between the dump housing and the interior of the collection drum in one embodiment and between the dump housing and the interior of the containment bag in the other embodiment. The drum or containment bag has a vent opening to which a vent line is attached, which connects the collection drum or containment bag to the interior of the waste chamber via a valve.

In operation, the waste container is positioned beneath the dust chamber with the sleeve aligned with the dump housing. The vent line is connected to the vent in the drum or in the containment bag with the vent valve closed. The sleeve is slipped over the dump housing and secured thereto. The system is now ready to transfer waste from the waste chamber to the collection drum or containment bag. The vent valve and the bellows valve in the dump housing, which had been closed, are both opened. Waste from the chamber flows by gravity to the drum, typically assisted by a vibrator attached to the side of the chamber. The blasting machine operation is suspended during this transfer operation, and the pressure inside the waste chamber is at atmospheric pressure. Air displaced by the incoming waste is vented back into the waste chamber via the vent opening and the vent line. To resume blasting operation, the bellows valve and the vent valve are both closed. Typically, although not necessarily, the waste chamber can be emptied several times into a drum before the drum is filled.

To remove the container when full, the bellows valve is closed, and the vacuum of the blasting machine is turned on in order to create a negative pressure in the dust chamber. The vent valve is opened, creating a negative pressure within the drum or containment bag, collapsing the containment sleeve. The collapsed sleeve is disconnected from the dump housing, and is sealed (e.g., by twisting), and pushed into the opening in the drum or into the containment bag. A plug is screwed into the opening in the drum, sealing the drum, and the vent line is disconnected and a plug inserted in the vent opening. When a containment bag is used, it is usually supported within a drum and a flat cover is placed over the drum with the thusly sealed containment bag in the drum.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a schematic drawing of a vacuum blasting machine with a sealed waste transfer system in accordance with the teachings of this invention.

FIG. 2 is a plan view of the top of a waste collection drum for the practice of the invention.

FIG. 3 is a partial sectional view taken along the line 3—3 in FIG. 2.

DETAILED DESCRIPTION OF A PREFERRED EMBODIMENT OF THE INVENTION

Figure 4:
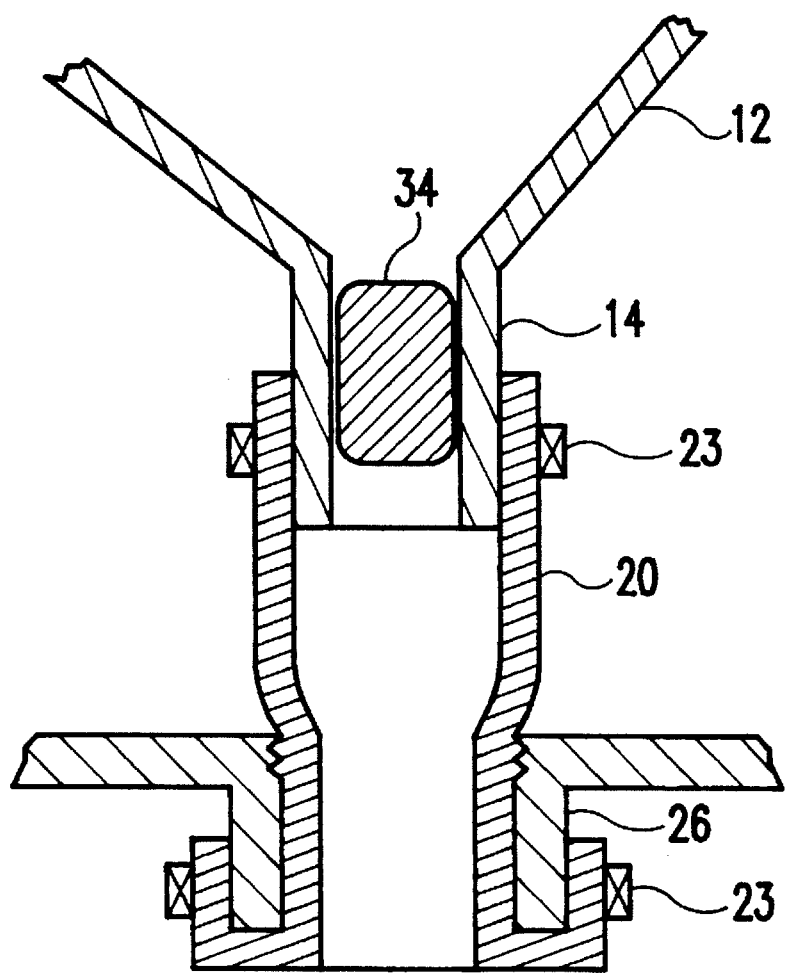
FIG. 4 is a detailed sectional view of a collection drum, dust dump housing, and interface containment sleeve in accordance with teachings of this invention.

Referring now to FIG. 1, it shows schematically a vacuum blasting apparatus known in the prior art with a waste drum 10 in position to receive waste from waste chamber 12 via waste container dump 14. A vent line 16 connects the interior of drum 10 to the interior of waste container 14 via a valve 18. A flexible sleeve 20 provides a containment barrier between the dump and the interior of the drum. It will be appreciated that the overall structure and operation of the vacuum blasting machine illustrated in FIG. 1 are well known to those skilled in the art and need not be described in greater detail here.

Referring now to FIG. 2, the top 21 of waste drum 10 preferably has an opening 22 through which waste drops from dump 14. There is also a vent opening 24 in the top 21 and two sight glasses 28 are formed in the top of the drum to allow an operator to see into the drum and determine how full of waste it is.

Referring now to FIGS. 3 and 4, an inwardly extending annular lip 26 provides a convenient structure to which one end of the flexible sleeve 20 can be secured. The flexible sleeve 20 may be made of any suitable material, such as 6 mil Mylar. Preferably, one end of the flexible sleeve is wrapped around the lip 26 by turning a section of the sleeve inside-out as shown in FIG. 4. The other end of the sleeve 20 is slipped over the exterior surface of the dump 14. Suitable clamps, such as flexible bands or radiator hose clamps indicated at 23, may be used to secure the flexible sleeve to the lip of the container and to the dust dump housing.

An inflatable, resilient bellows valve member 34 is disposed within the dump housing, shown here in its inflated, waste blocking position. When the pressure within the resilient bellows valve member 34 is reduced, it contracts, forming a passage between it and the interior wall of the dump housing, allowing the gravity flow of dust particles from the waste chamber 12 into the dust collection drum. The dashed lines in FIG. 4 illustrate the sleeve 20 in its evacuated, pinched-off condition prior to removal from the dump housing, as explained in more detail below.

Figure 5A:
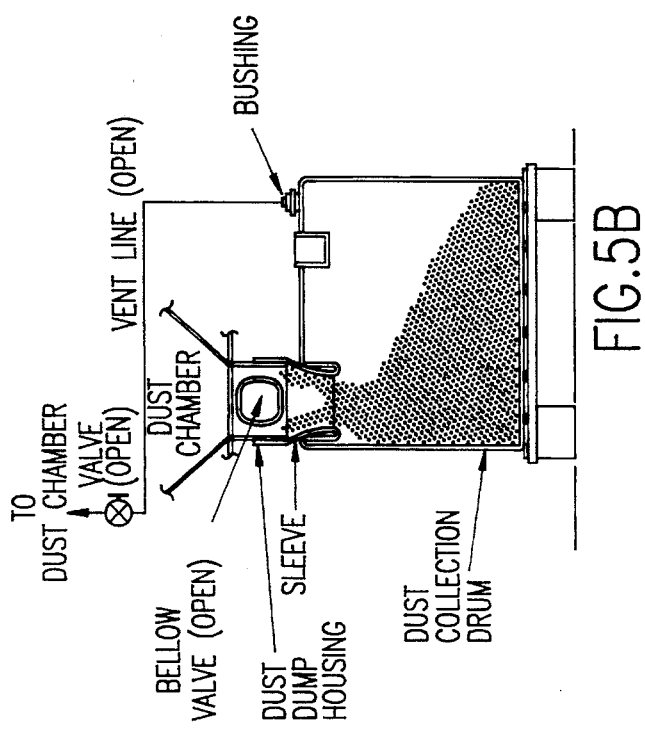
FIGS. 5a, 5b, 5c, 5d and 5e illustrate respectively the steps of connecting, dumping, disconnecting, sealing, and removing a sealed waste transfer system in accordance with the teachings off this invention.

Referring now to FIGS. 5a through 5e, they show the sequence of steps in transferring waste from the waste chamber 12 to the dust collection drum 10 in accordance with the teachings of this invention. Referring first to FIG. 5a, the dust collection drum is moved into position so that the opening 22 in the drum is positioned beneath the waste dump 14. The flexible sleeve 20 is secured in place between the drum and the dump housing, as explained in connection with FIGS. 3 and 4. During this operation, the bellows valve member 34 is in its expanded, closed position. The vent line 16 is connected to vent opening 24 in the airtight waste collection drum 10 via a suitable bushing. The vent line 16 connects the interior of the dust collection drum to the interior dust chamber. Valve 18 is in its closed position at this initial state.

Figure 5B:
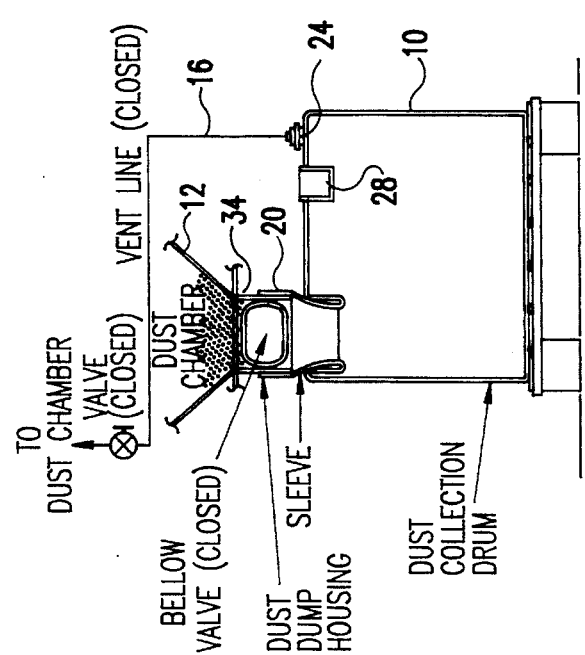

Referring now to FIG. 5b, in transferring waste from the waste chamber 12 to the dust collection drum 10, the vacuum blasting operation is stopped so that the pressure in waste chamber 12 rises to atmospheric pressure. The bellows valve is opened, allowing dust to flow from the waste chamber 12 into the dust collection drum 10 through the sleeve 20, which forms a containment barrier between the dust dump housing and the dust collection drum. The valve 18 is open during this operation so that air displaced by the dust flowing into the dust collection drum is vented back into the dust chamber, thus providing a completely sealed system during the waste transfer operation. When the waste chamber 12 is empty or substantially empty, the bellows valve is closed, stopping the flow of dust between the chamber and the drum. Here it should be noted, typically the waste chamber can be emptied several times before it fills a single waste collection drum, so that this operation explained in connection with FIG. 5b can be repeated before moving to the disconnect operation of FIGS. 5c et seq. The sight glasses 28 allow the operator to determine whether or not the waste collection drum is full; i.e., within six inches of the top of the drum. Valve 18 is closed.

Figure 5C:
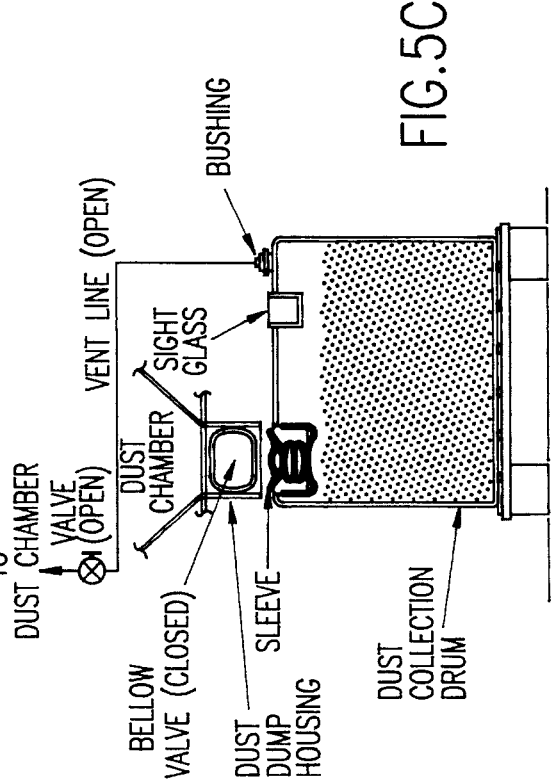

Referring now to FIG. 5c, in order to disconnect the collection drum from the dump housing, the vacuum system of the vacuum blasting system is used to reduce the pressure in the dust chamber to below atmospheric pressure, which is the normal operating pressure in the dust chamber during blasting operation. The valve 18 is opened, thereby establishing a pressure below atmospheric pressure within the dust collection drum 10. The sleeve 20 collapses on itself and in this collapsed state is removed from the dust dump housing. It is sealed by twisting, for example. It is then pushed into the drum through the opening 22.

Figure 5E:
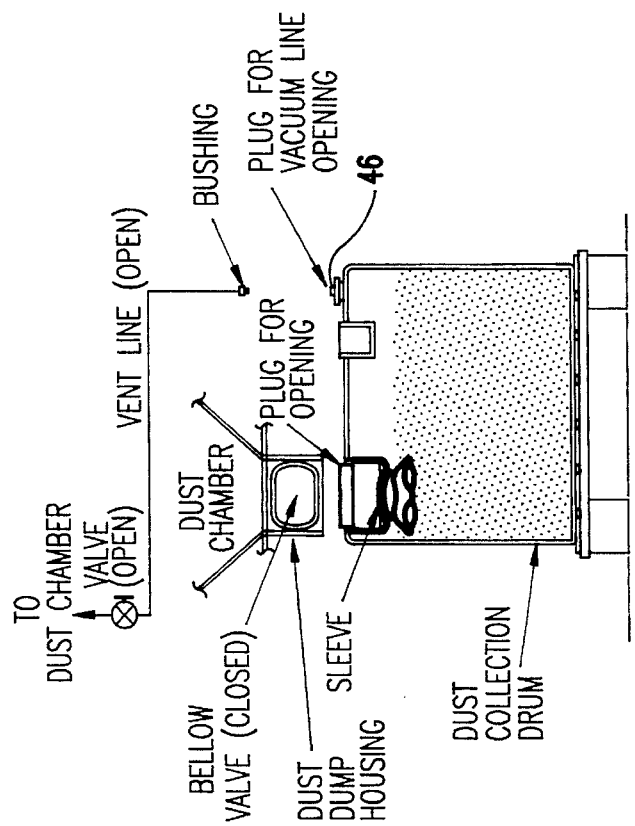
Figure 5D:
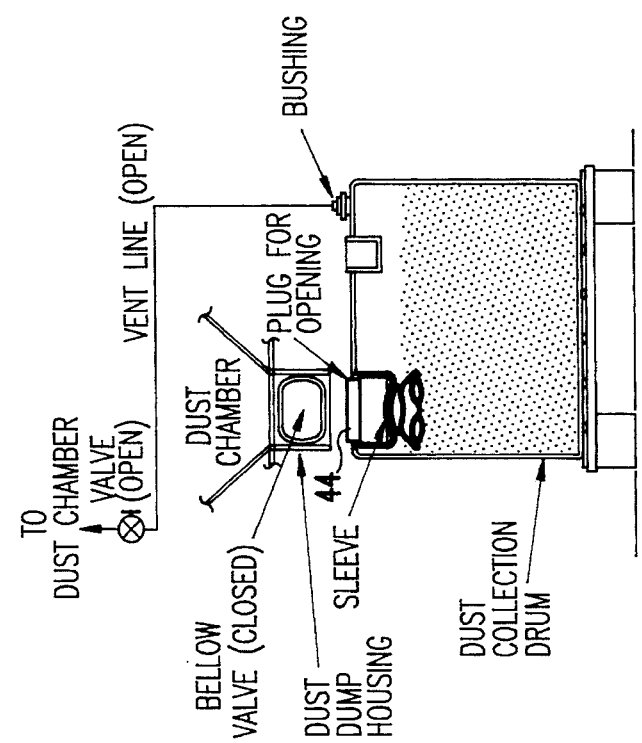

As shown in FIG. 5d, the next step is to screw a plug 44 into the opening 22 while the vent line maintains a negative pressure within the dust collection drum. Finally, as shown in FIG. 5e, the vent line is removed and a plug 46 is screwed into the vacuum line opening, sealing the container. During this final step, it should be noted that, since the space in the drum above the waste is below atmospheric pressure prior to removal of the vent line, at the time of disconnection air will flow into the drum, thereby ensuring no dispersal of waste into the air while the vent plug is being secured.

Figure 6:
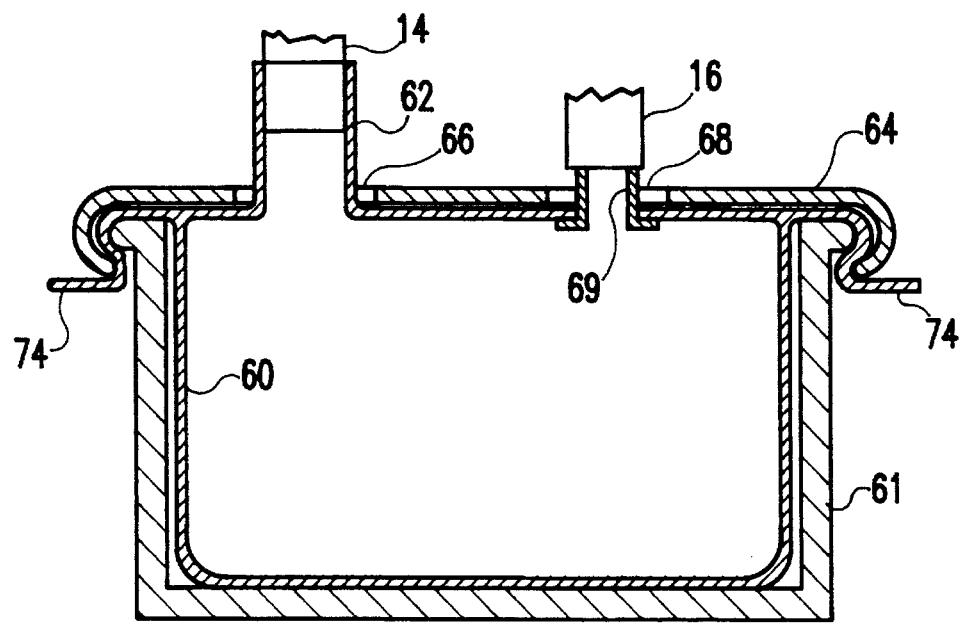
FIG. 6 is a side sectional view of a preferred containment bag embodiment of the invention.
Figure 7:
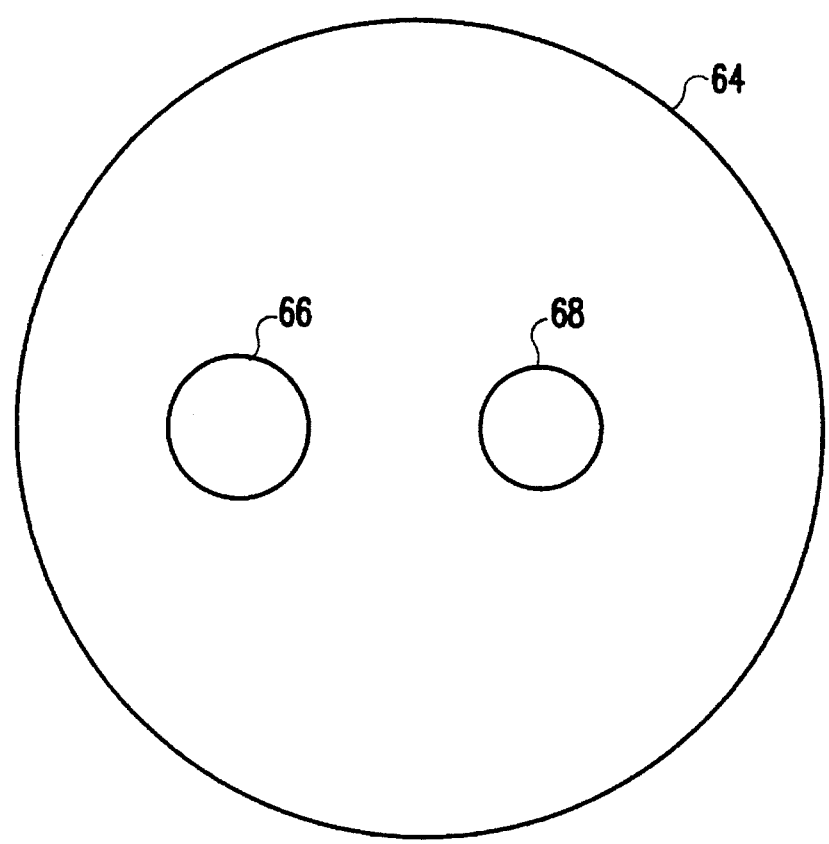
FIG. 7 is a plan view of the lid used in the embodiment of FIG. 6.

While the system described in connection with FIG. 5 is satisfactory in operation, the lid of the waste drum in that embodiment is relatively costly and as it is used to seal the waste within the drum is not ordinarily reusable. A preferred embodiment of the invention is shown in FIGS. 6 and 7. In this embodiment, a containment bag 60 in the drum is used to collect the waste and contain it. The containment bag 60 is conveniently made of a suitable plastic material, such as translucent 6 mil Mylar, and has a collapsible sleeve 62, through which debris from the waste chamber flows into the containment bag 60. The bag 60 is supported in a drum 61, covered by a drum lid 64, which has two openings, 66 and 68. The sleeve 62 extends through the opening 66 and a suitable fitting 69 secured to an opening in the bag 60 extends through the opening 68. Vent line 16 is attached to fitting 69. Opening 68 also serves as a window to allow an operator to determine when the containment bag 60 is filled. Preferably, the fitting 69 includes a shut off mechanism, such as a flapper, to seal the vent opening when the vent line is removed. Alternatively, the fitting can be capped or crimped closed when the vent line is removed.

In the embodiment shown, the containment bag has a peripheral apron 74 that extends beyond the rim of the drum 61 and is clamped between the lid 64 and the drum rim in order to support the containment bag within the drum when the bag is being filled.

The operation, when using a containment bag 60, is essentially the same as the operation described in connection in FIGS. 5a–5e. In the operation of transferring waste from the chamber, the sleeve 62 is secured to the outside of the dump housing 14 and the vacuum line 16 is connected to the containment bag via the fitting 69. When the containment bag is filled, the dump valve is closed, and the vacuum line is used to create a sub-atmospheric pressure within the containment bag, collapsing the sleeve 62 as it is removed from the dump housing. The sleeve is then secured in closed position and the vacuum line removed from the fitting 69, which is also sealed. At this point the lid 64 can be removed without risk of the debris in the containment bag escaping, and a lid without openings secured to the top of the drum to seal the containment bag inside the drum 61.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A sealed waste container for a vacuum blasting system, which has a waste chamber and a waste chamber dump through which waste is removed from said waste chamber, comprising in combination:

said sealed waste container having an opening therein, said sealed waste container movable between a first position with said opening proximate said waste dump and a second position with said opening remote from said waste dump;

a flexible sleeve with one end secured to said sealed waste container around said opening and its other end adapted to be secured to said waste dump, forming a containment barrier between said waste dump and the interior of said sealed waste container; and a vent opening in said sealed waste container adapted to be connected to a vent line that extends from said vent opening to said waste chamber.

2. A sealed waste container as in claim 1, wherein said waste container comprises a rigid drum.

3. A sealed waste container as in claim 1, wherein said waste container comprises a flexible containment bag.

4. A sealed waste container as in claim 3, wherein said flexible containment bag is supported within a rigid drum.

* * * * *